US 8,260,146 B2

(12) United States Patent
Graves

(10) Patent No.: US 8,260,146 B2
(45) Date of Patent: Sep. 4, 2012

(54) FREE-SPACE OPTICAL TRANSCEIVER USING MULTIMODE FIBER TO COUPLE SINGLE MODE INPUT OPTICAL SIGNAL

(75) Inventor: J. Elon Graves, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 312 days.

(21) Appl. No.: 12/684,059

(22) Filed: Jan. 7, 2010

(65) Prior Publication Data

US 2010/0172649 A1    Jul. 8, 2010

Related U.S. Application Data

(60) Provisional application No. 61/143,137, filed on Jan. 7, 2009.

(51) Int. Cl.
*H04B 10/00* (2006.01)
(52) U.S. Cl. .................. 398/128; 398/118; 398/139
(58) Field of Classification Search ........... 398/115–139
See application file for complete search history.

(56) References Cited

U.S. PATENT DOCUMENTS

| 6,452,145 | B1 | 9/2002 | Graves et al. |
| 6,464,364 | B2 | 10/2002 | Graves et al. |
| 6,568,647 | B2 | 5/2003 | Graves et al. |
| 6,721,510 | B2 | 4/2004 | Graves et al. |
| 7,039,278 | B1 * | 5/2006 | Huang et al. ............... 385/47 |
| 7,194,159 | B1 * | 3/2007 | Graves ..................... 385/31 |
| 7,593,641 | B2 * | 9/2009 | Tegge, Jr. ................. 398/125 |
| 2004/0258414 | A1 * | 12/2004 | Lee ......................... 398/115 |

* cited by examiner

*Primary Examiner* — Dzung Tran
(74) *Attorney, Agent, or Firm* — Fenwick & West LLP

(57) ABSTRACT

An optical circulator couples optical fibers of dissimilar modes. In one embodiment, an optical circulator couples a single mode first fiber to a multimode second fiber, which is used as an optical input to a telescope. The multimode fiber does not significantly degrade the mode structure of the light form the single mode fiber. In the reverse direction, light received by the telescope is coupled into the multimode second fiber, which the circulator couples to a multimode third fiber.

14 Claims, 3 Drawing Sheets

FREE-SPACE OPTICAL TRANSCEIVER USING MULTIMODE FIBER TO COUPLE SINGLE MODE INPUT OPTICAL SIGNAL

CROSS-REFERENCE TO RELATED APPLICATION(S)

This application claims priority under 35 U.S.C. §119(e) to U.S. Provisional Patent Application Ser. No. 61/143,137, "Free-Space Optical Transceiver Using Multimode Fiber to Couple Single Mode Input Optical Signal," filed Jan. 7, 2009 by J. Elon Graves. The subject matter of the foregoing is incorporated herein by reference in its entirety.

BACKGROUND OF THE INVENTION

1. Field of the Invention

This invention relates to optical transceivers used in free space optical communications systems.

2. Description of the Related Art

There is a rapidly expanding need for data transmission. For example, while the use of fiber optics has increased the capacity and efficiency of data transmission, expanding data transmission needs require continual additions to the fiber optics infrastructure at significant expense and difficulty. One approach to augmenting the data transmission system is through the use of free space optical communications systems, which transmit light waves through the free space of the atmosphere.

U.S. Pat. No. 6,721,510, "Atmospheric Optical Data Transmission System" by J. Elon Graves and Malcolm J. Northcott discloses various free space optical communications systems that use adapative optics to compensate for atmospheric conditions. In many free space optical communications systems, a shared telescope is used to both transmit an outgoing optical beam and to receive an incoming optical beam. For example, the outgoing optical beam may be used to transmit data to a distant location while the incoming optical beam is used to receive data transmitted from the distant location. For many reasons, it can be advantageous for the outgoing and incoming optical beams to share largely the same free-space optical path within the telescope.

However, at some point, the two optical signals must be separated. An optical circulator is a nonreciprocal device that is commonly used for this purpose in fiber optic communications systems. An optical signal that enters port 1 of the optical circulator exits from port 2, but an optical signal that enters port 2 does not exit from port 1. It exits from a different port 3 instead. However, most, if not all, optical circulators that are used in fiber optic communications networks are symmetric. All of the ports typically are single mode fibers. Along the transmit optical path, the optical circulator couples light from the input port 1 single mode fiber to the port 2 single mode fiber to be transmitted as an outgoing optical signal to another fiber node. Along the receive optical path, the optical circulator couples an incoming optical signal from the port 2 single mode fiber to the output port 3 single mode fiber. The symmetric design is generally preferred for fiber optic communications networks because single mode fibers are generally preferred due to their performance.

However, this approach usually is not suitable for free space optical communications systems. In these systems, the light that is transmitted from a transceiver may have a well-defined Gaussian shape and therefore may arrive via a single mode fiber. However, due to effects such as aberrations along the free space optical communications link and overfilling of the receive aperture, the light received by a transceiver typically does not have such a tightly controlled mode and cannot be efficiently coupled back into a single mode fiber.

U.S. Pat. No. 7,194,159, "Asymmetric Optical Circulator" by J. Elon Graves discloses an asymmetric optical circulator that addresses the asymmetry introduced by free space optical communications systems. In the asymmetric optical circulator, input port 1 is a single mode fiber, port 2 is a free space port (i.e., not coupled to a fiber) coupled to the rest of the telescope, and output port 3 is a multimode fiber. In this way, along the transmit path, a single mode optical signal can be transmitted via single mode fiber port 1 and free space port 2. At the same time, a more distorted (i.e., multimode) optical beam can be received via free space port 2 and multimode fiber port 3. However, since port 2 of the optical circulator couples directly to the rest of the telescope, this approach requires precise alignment of the optical circulator with the rest of the optical train of the telescope.

Therefore, there is a need for improved approaches to coupling input and output signals to free space optical communications systems.

SUMMARY OF THE INVENTION

The present invention overcomes the limitations of the prior art by providing an optical circulator coupling optical fibers of dissimilar modes. In one embodiment, an optical circulator couples a single mode first fiber to a multimode second fiber, which is used as an optical input to a telescope. The multimode fiber does not significantly degrade the mode structure of the light from the single mode fiber. In the reverse direction, light received by the telescope is coupled into the multimode second fiber, which the circulator couples to a multimode third fiber. In some designs, the multimode second fiber is suitable for Gigabit Eithernet transmission.

In one variation, the transceiver also includes an adaptive optics system operably coupled to the telescope for correcting a wavefront of the transmitted and/or received light. The adaptive optics system may pre-correct a wavefront of the transmitted light and post-correct a wavefront of the received light. Preferred wavelength ranges for data communication include the 1.3 µm range and the 1.5 µm range.

Other aspects of the invention include methods, systems, applications and components related to the transceivers described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
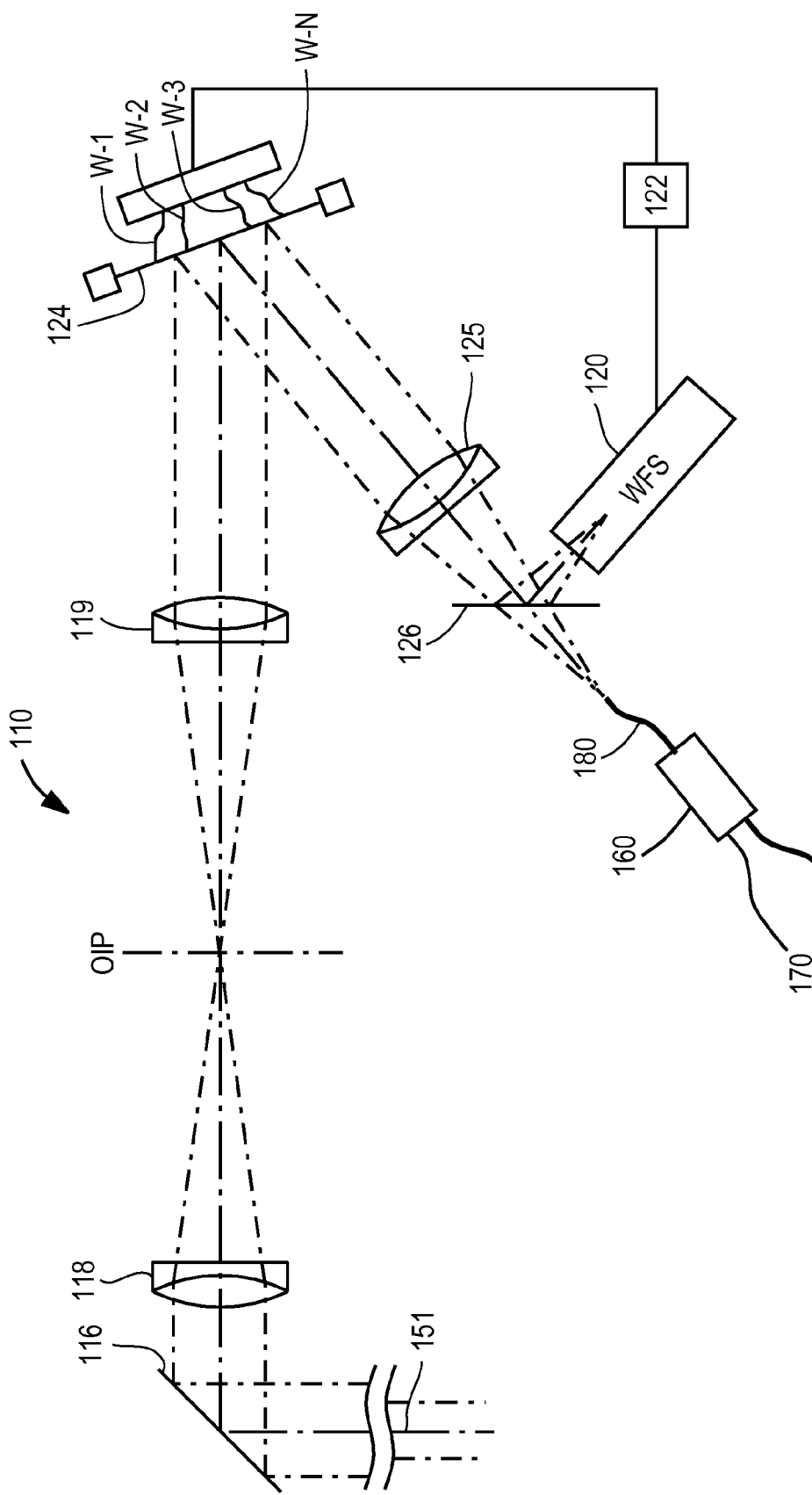
FIG. 1 is an illustration of an example optical train for a transceiver according to the invention.

FIG. 1 is an illustration of an example optical train for a transceiver according to the invention. The system includes a telescope 110, a deformable mirror 124 and a wavefront sensor 120. The deformable mirror 124 and wavefront sensor 120 are located in the optical path of the telescope, with the wavefront sensor 120 downstream of the deformable mirror 124. The system also includes an optical circulator 160, with three ports. A single mode fiber 170 is coupled to port 1, a multimode fiber 180 to port 2 and a multimode fiber 190 to port 3. The other end of multimode fiber 180 functions as the optical input (or output) of telescope 110.

In the receive direction, the system collects light 151 from a remote source (e.g., from a transmitting telescope) and couples it into multimode fiber 180. The light then exits the circulator 160 via port 3 and multimode fiber 190. Multimode fibers 180 and 190 allow the capture of more light since the incoming optical beam may not be perfectly diffraction limited, even though corrected by adaptive optics. In more detail, the light rays travel through a lens 118 that focuses the light rays on an object image plane OIP where the image of the remote light source exists in focus but is uncorrected. The light rays then pass through a collimating lens 119 to a deformable mirror 124. The deformable mirror 124 is dynamically shaped to correct for aberrations in the wavefront. It is controlled according to wavefront measurements made by the wavefront sensor 120. A conjugate tuning element located at the OIP allows adjustment of the conjugate planes for the deformable mirror 124.

The deformable mirror 124 and wavefront sensor 120 form an adaptive optics loop that compensates for aberrations along the free space optical communications link. The deformable mirror 124 introduces an adjustable phase that compensates for the effects of unwanted aberrations, thus reducing the residual aberration in the wavefront. Examples of adjustable phase devices other than deformable mirrors include liquid crystal devices, MEMS mirrors, acousto-optic, thermo-optic, magneto-optic and electro-optic modulators, eidophors and optically written optically active materials devices. In this particular example, the deformable mirror is a deformable curvature mirror based on applying different voltages across different areas of a piezoelectric material, thus causing deformation. Further details for this type of deformable mirror are described and shown in U.S. Pat. No. 6,464,364, "Deformable Curvature Mirror" by J. Elon Graves and Malcolm J. Northcott; U.S. Pat. No. 6,568,647, "Mounting Apparatus for Deformable Mirror" by J. Elon Graves and Malcolm J. Northcott; and U.S. Pat. No. 6,721,510, "Atmospheric Optical Data Transmission System" by J. Elon Graves and Malcolm J. Northcott. All of the foregoing are incorporated herein by reference.

The wavefront sensor 120 takes a measure of the actual amount of residual aberration after correction and the deformable mirror 124 is controlled accordingly. In this example, a portion of the corrected wavefront is tapped by beamsplitter 126 and directed to the wavefront sensor 120. The wavefront sensor 120 measures the residual aberration and control module 122 sends the corresponding control signals to the deformable mirror 124. In this way, the wavefront of the incoming optical beam can be corrected for aberrations, resulting in better image quality and/or collection efficiency at multimode fiber 180. Examples of wavefront sensors 120 include Hartmann-Shack wavefront sensors and wavefront curvature sensors. In this example, the wavefront sensor 120 is a wavefront curvature sensor based on defocused pupil images. Further details for this type of wavefront curvature sensor are described and shown in U.S. Pat. No. 6,452,145, "Method and Apparatus for Wavefront Sensing" by J. Elon Graves and Malcolm J. Northcott; and U.S. Pat. No. 6,721,510, "Atmospheric Optical Data Transmission System" by J. Elon Graves and Malcolm J. Northcott. All of the foregoing are incorporated herein by this reference.

In the transmit direction, the incoming optical signal arrives via single mode fiber 170. This input optical signal is a high quality wave, preferably a single mode optical signal. The input signal exits circulator 160 via multimode fiber 180, which generates a near-diffraction-limited optical beam that is transmitted by telescope 110 over the same free space optical communications link as the received optical beam.

The multimode fiber 180 is selected so that it largely preserves the single mode nature of the signal received from single mode fiber 170. The single mode signal from fiber 170 primarily couples into the lower order modes of multimode fiber 180. Multimode fibers with too much contaminants generally will not have sufficient performance because the contaminants can cause coupling into higher order modes. In some systems, higher quality multimode fibers designed for Gigabit Ethernet applications are preferred. The use of sufficient quality multimode fiber 180 allows a single fiber to be used both to generate the transmitted optical beam and to capture the received optical beam. This allows the circulator assembly 160 to be physically separated from the telescope 110. It also means that the end of multimode fiber 180, rather than circulator 180, is aligned with the telescope, which generally is a simpler task.

In this example, input fiber 170 is single mode and output fiber 190 is multimode. In alternate embodiments, both fibers 170 and 190 may be multimode albeit with different coupling characteristics (e.g., different core diameters). Fiber 180 preferably does not significantly degrade the mode structure of the optical signal from fiber 170, even though fiber 180 is a "higher mode fiber" than fiber 170.

The optical beam from the source fiber 170 is pre-corrected by the deformable mirror 124. This increases the amount of energy incident on the receiving telescope and can also reduce scintillation effects. Note that much of the optical path traveled by the received optical beam and by the transmitted optical beam is common. Thus, the same adaptive optics correction can be applied both to post-correct the received optical beam and to pre-correct the transmitted optical beam.

The adaptive optics preferably corrects the wavefront at a rate that is significantly faster than the rate of change of aberrations along the optical path, for example preferably faster by about a factor of ten or more. If the aberrations are primarily caused by atmospheric conditions, it is desirable that the deformable mirror 124 make adjustments at a rate of about 10 kHz or greater since turbulence microcells in the atmosphere change at a rate of about 1 kHz.

Figure 2:
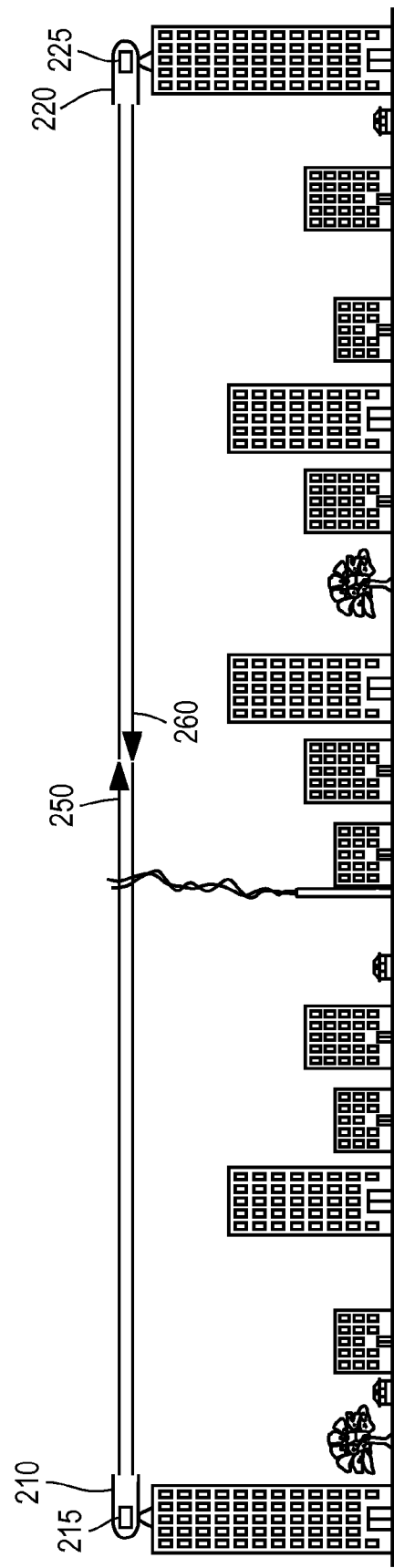
FIG. 2 is an illustration of a free space optical communications system suitable for use with the transceiver of FIG. 1.

FIG. 2 is a diagram of a free space optical communications system suitable for use with the transceiver of FIG. 1. This system is used in an urban environment where a transmitter 210 and receiver 220 are located on the roofs of two buildings. For convenience, the term "transceiver" will be used to refer to modules that only transmit 210 and to modules that only receive 220, as well as to modules that both transmit and receive. The transceiver shown in FIG. 1 is suitable for use as transceivers 210 and/or 220.

Each transceiver 210, 220 includes a telescope that is pointed at the telescope of the other transceiver. The transmitting telescope 210 typically includes components for tracking and directing an optical beam 250 to the receiving telescope 220. The receiving telescope 220 typically includes components for following and receiving the optical beam 250 from the transmitting telescope 210. Examples of components that can be used for these purposes include steering mirrors, mechanical gimbals, tracking mechanisms and control loops, auto-focus and zoom capability.

The free space optical communications link 250 can suffer from time-varying aberrations. For example, for many applications, the effect of the atmosphere can be a significant source of aberrations. The density of the atmosphere generally varies across time and space, typically at a rate of about 2 kHz or less for turbulent cells. The resulting aberrations can cause unwanted effects, such as divergence resulting in beam wander, scintillation patterns at the receiver 220 and degraded wavefronts.

FIG. 2 shows buildings of different heights, automobiles, roadways, trees and a smoke stack on one building, which create different atmospheric conditions. Rain, fog, smoke and the like lower the intensity of the transmitted light. Conditions such as sun-induced and structure-created heat waves, air conditioning discharges, heat exchanger discharges, automobile exhaust, etc. create aberrations along the optical link 250 in addition to the normal atmospheric aberrations caused by weather conditions. In rural applications, the varying terrain and vegetation can influence the aberrations along the optical link 250.

In FIG. 2, each transceiver 210, 220 includes an adaptive optics module 215, 225 operably coupled to the telescope, in order to mitigate the atmospheric conditions that otherwise would adversely affect the transmission and reception of light waves. In the transmitter 210, the adaptive optics 215 pre-corrects the wavefront of the outgoing light. This pre-correction reduces beam wander and scintillation patterns at the receiver 220, thus increasing the amount of light incident on the receiver 220 and also improving the wavefront quality of the received optical beam. At the receiver 220, the adaptive optics 225 corrects aberrations in the received wavefront, thus improving the image quality and/or collection efficiency at the receiver.

At the receiver 220, the wavefront correction applied by the adaptive optics module 225 is determined based on the wavefront of the incoming optical beam 250. A counter-propagating probe beam 260 is used for the adaptive optics module 215 at the transmitter 210. The probe beam 260 propagates along approximately the same optical path as the primary data-encoded beam 250, but in the opposite direction. It can be the same wavelength as or a different wavelength than the primary beam 250. The probe beam 260 experiences substantially the same aberrations as the primary beam 250 and the pre-correction applied by the adaptive optics module 215 is based on the wavefront of the probe beam 260. In a similar fashion, a co-propagating probe beam (not shown in FIG. 2) could be used at the receiver 225 as the basis for correcting the wavefront of the primary beam 250, rather than using the primary beam 250 itself.

The communications link 250 is shown as unidirectional. Two separate unidirectional systems can be used to create a bi-directional system. More economically, the transmitter and receiver at each location can be combined into a single unit, for example by providing both a data source (e.g., a modulated laser or a fiber optic feed) and a data receiver (e.g., a photodetector or an outgoing optical fiber) at each transceiver 210, 220 and sharing much of the same telescope optics, including adaptive optics correction.

For example, in FIG. 2, optical beam 260 could also be encoded with data. Then, for data transmission from 210 to 220, transceiver 210 is the transmitter, beam 250 is the data-encoded primary beam, beam 260 is the probe beam, and transceiver 220 is the receiver. In the reverse direction, transceiver 220 is the transmitter, beam 260 is the data-encoded primary beam, beam 250 is the probe beam, and transceiver 210 is the receiver. Note that each beam 250, 260 serves two purposes. It is the data encoded primary beam in one direction and the probe beam in the other direction. In addition, each adaptive optics module 215, 225 pre-corrects beams that are leaving that transceiver and post-corrects beams received by that transceiver. An alternate implementation uses four beams: two data-encoded beams and two probe beams, all sharing the same telescope optics at both transceivers 210, 220.

Figure 3:
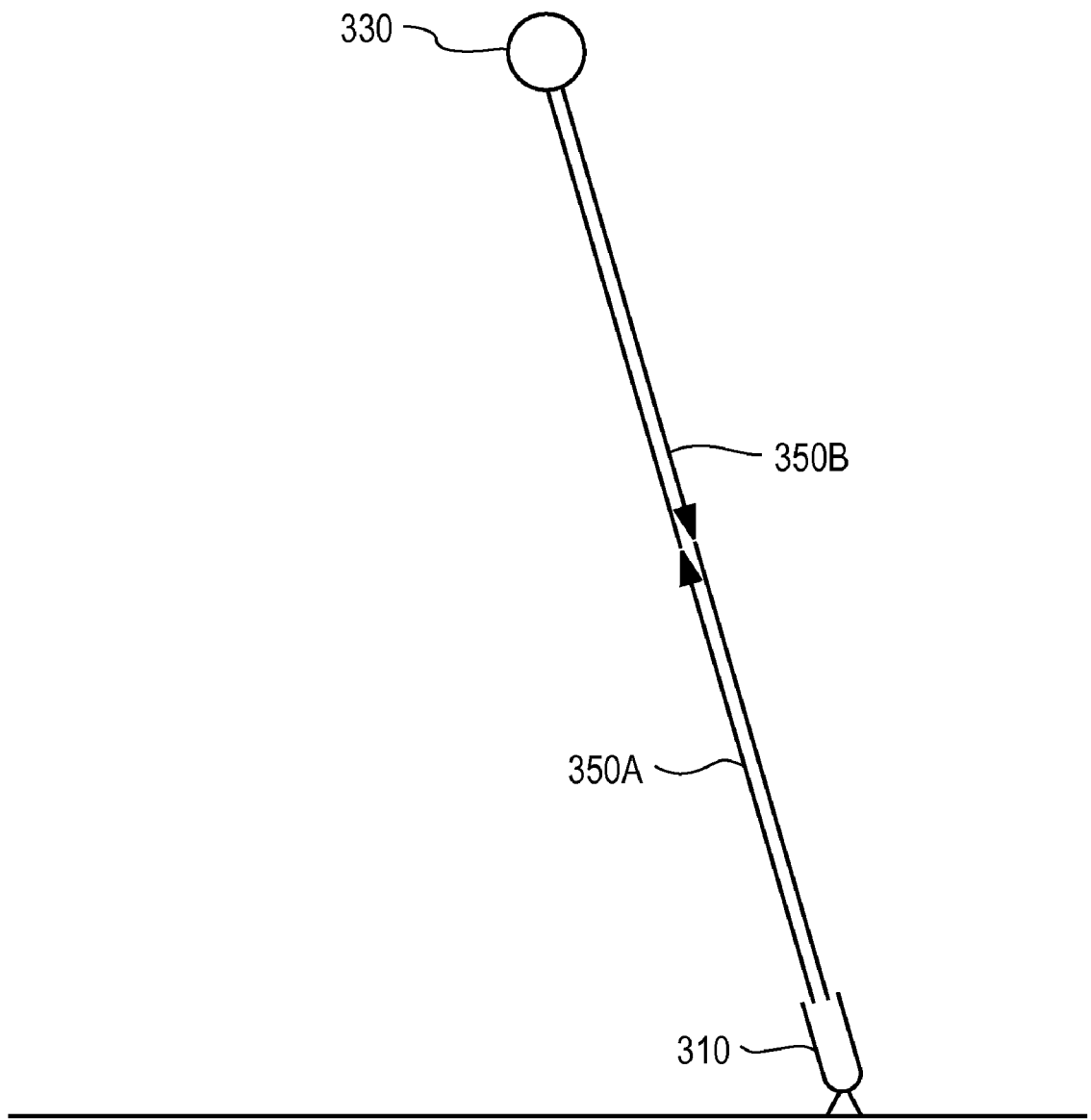
FIG. 3 is an illustration of another free space optical communications system suitable for use with the transceiver of FIG. 1.

FIG. 3 is an illustration of another free space optical communications system suitable for use with the transceiver of FIG. 1. This example uses a modulated retro reflector 330. The transceiver 310 transmits an optical beam 350A to the retro reflector 330. Modulation of the retro reflector 330 encodes data onto the beam and the retro reflector 330 reflects the data-encoded beam 350B back to the general vicinity of the original source 310. The transmitting telescope 310 receives the return beam 350B. An adaptive optics module can be used to pre- and/or post-correct the optical beam 350.

Note that at each of the transceivers in FIGS. 2 and 3, the beam transmitted from a telescope preferably is diffraction limited. This yields a small spot at the far field, concentrating more energy at the receiving telescope. A single mode fiber (such as fiber 170 in FIG. 1) is a good source to produce this type of beam. In contrast, the optical beam received by the telescope typically will not be diffraction limited. At long link distances with low aberrations, the received beam typically will have a uniform intensity across the aperture of the receiving telescope. This is not the ideal intensity profile for efficient coupling into a single mode fiber; the ideal intensity profile is a Gaussian profile. To make matters worse, under strong scintillation conditions, the pupil illumination may include significant speckle, making it even more difficult to efficiently couple into a single mode fiber. Thus, a multimode fiber (such as fiber 190 in FIG. 1) is preferred for coupling of the received beam.

The figures shown above are merely examples. Other implementations will be apparent. For example, the optical paths for the transmitted beam and the received beam may not be exactly counter-propagating. They may be slightly separated. For example, if a ground-based transceiver is communicating with a satellite, the transmitted beam may be required to "lead" the received beam in order to account for the satellite's motion. This point-ahead requirement will result in slightly separated optical paths for the transmitted beam and the received beam. The beams may be separated in space and/or in angle at the point where they are incident on the multimode fiber 180 of FIG. 1.

Furthermore, the choice of wavelengths, data rate, link distance, telescope design, data sources and light sources, data receivers and other design choices will depend on the application. Data rates and distances upwards of 100 Gbps and 27 km have been experimentally demonstrated, although different combinations of data rates and distances can be appropriate depending on the application. Wavelengths in the 1.55 µm (micron) wavelength region are currently preferred for telecommunications applications, although other wavelengths may be used and even preferred under certain atmospheric conditions or for other types of applications. For instance, the 1.3 µm wavelength region may perform well in a single wavelength mode. Terms such as "optical" or "light" are not intended to be limited to any one specific wavelength range. Nor are they meant to be limited to the visible region of the electromagnetic spectrum.

The adaptive optics module can also have different levels of sophistication. In simple applications, correction of only tip/tilt with or without focus may be sufficient. In more demanding applications, correction of higher order aberrations can be implemented. Simple first order adaptive optics corrections such as tip/tilt may be implemented or augmented by other components such as a steering mirror, leaving the adaptive optics module to correct for higher order aberrations. Alternately, the multimode fiber approach shown in FIG. 1 can be used in systems with no adaptive optics capability.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A transceiver for use in a free space optical communications system, the transceiver comprising:
   an optical circulator having a first port coupled to a first optical fiber, a second port coupled to a second optical fiber and a third port coupled to a third optical fiber, the optical circulator coupling first light received at the first port to the second port and further coupling second light received at the second port to the third port, the second optical fiber being a higher mode fiber than the first optical fiber but not significantly degrading a mode structure of the first light from the first optical fiber, the third optical fiber being a higher or comparable mode fiber to the second optical fiber; and
   a telescope operably coupled to the second optical fiber, the telescope for transmitting the first light along a first free space optical path and further for receiving the second light along a second free space optical path that is substantially counter-propagating to the first free space optical path.

2. The transceiver of claim 1 wherein the first optical fiber is a single mode fiber and the second and third optical fibers are multimode fibers.

3. The transceiver of claim 2 wherein the second optical fiber is a multimode fiber suitable for Gigabit Ethernet transmission.

4. The transceiver of claim 2 wherein the first light from the first optical fiber has a single mode structure and the second optical fiber largely preserves the single mode structure of the first light.

5. The transceiver of claim 1 wherein the first and second free space optical paths are exactly counter-propagating.

6. The transceiver of claim 1 wherein the first and second free space optical paths are substantially counter-propagating but separated to account for point ahead.

7. The transceiver of claim 1 wherein the first light and the second light have wavelengths within the 1.3 μm range.

8. The transceiver of claim 1 wherein the first light and the second light have wavelengths within the 1.5 μtm range.

9. The transceiver of claim 1 further comprising:
   an adaptive optics system operably coupled to the telescope for correcting a wavefront of at least one of the first light and the second light.

10. The transceiver of claim 9 wherein the adaptive optics system pre-corrects a wavefront of the first light and post-corrects a wavefront of the second light.

11. The transceiver of claim 1 wherein both the first light and the second light are data encoded.

12. The transceiver of claim 1 wherein the first light is data encoded and the second light is not data encoded.

13. The transceiver of claim 1 wherein the first light is not data encoded and the second light is data encoded.

14. The transceiver of claim 1 wherein the second light is a retro-reflected version of the first light.

* * * * *

UNITED STATES PATENT AND TRADEMARK OFFICE
CERTIFICATE OF CORRECTION

PATENT NO. : 8,260,146 B2
APPLICATION NO. : 12/684059
DATED : September 4, 2012
INVENTOR(S) : J. Elon Graves It is certified that error appears in the above-identified patent and that said Letters Patent is hereby corrected as shown below:

In Column 8, line 19, replace "1.5µtm" with --1.5µm--.

Signed and Sealed this
Twenty-sixth Day of February, 2013

Teresa Stanek Rea
*Acting Director of the United States Patent and Trademark Office*